US008023756B2

(12) United States Patent
Tsutsumi et al.

(10) Patent No.: US 8,023,756 B2
(45) Date of Patent: Sep. 20, 2011

(54) IMAGE ENCODING APPARATUS AND METHOD OF CONTROLLING SAME

(75) Inventors: Takayuki Tsutsumi, Kawasaki (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 624 days.

(21) Appl. No.: 12/196,624

(22) Filed: Aug. 22, 2008

(65) Prior Publication Data
US 2009/0080786 A1     Mar. 26, 2009

(30) Foreign Application Priority Data

Sep. 20, 2007     (JP) .................. 2007-244447

(51) Int. Cl.
*G06K 9/46*     (2006.01)
(52) U.S. Cl. ........ 382/243; 382/232; 382/233; 382/162; 382/190; 382/199; 358/426.01
(58) Field of Classification Search ................. 382/232, 382/233, 243, 164, 167, 173, 190, 198, 199.192, 382/264; 345/555; 348/384.1, 440.1; 358/426.01, 358/426.16; 375/240.01, 240.18, 240.16, 375/240.29
See application file for complete search history.

(56) References Cited

U.S. PATENT DOCUMENTS

| | | | |
|---|---|---|---|
| 5,818,970 A | 10/1998 | Ishikawa et al. | |
| 6,252,992 B1 | 6/2001 | Ishikawa | 382/239 |
| 7,899,258 B2 * | 3/2011 | Liu et al. | 382/232 |
| 2002/0159106 A1 * | 10/2002 | Fuchigami et al. | 358/518 |
| 2003/0035673 A1 * | 2/2003 | Yamakawa | 400/76 |
| 2004/0076337 A1 * | 4/2004 | Nishida | 382/274 |
| 2005/0180645 A1 * | 8/2005 | Hasegawa et al. | 382/239 |
| 2006/0203003 A1 * | 9/2006 | Fujita | 345/589 |
| 2007/0189615 A1 * | 8/2007 | Liu et al. | 382/232 |
| 2007/0217701 A1 * | 9/2007 | Liu et al. | 382/234 |
| 2007/0230810 A1 * | 10/2007 | Kanatsu | 382/243 |
| 2008/0033973 A1 | 2/2008 | Tsutsumi | 707/101 |
| 2008/0037883 A1 | 2/2008 | Tsutsumi et al. | 382/232 |

FOREIGN PATENT DOCUMENTS

JP     4-326669     11/1992

* cited by examiner

*Primary Examiner* — Samir Ahmed
*Assistant Examiner* — Ali Bayat
(74) *Attorney, Agent, or Firm* — Fitzpatrick, Cella, Harper & Scinto

(57) ABSTRACT

This invention encodes an image mixed of a character or line-drawing image and a natural image. An extraction unit extracts the color of a pixel, which constitutes a high-frequency component, from the input image data as an extracted color and generates identification information indicating whether each pixel in the image data is a pixel of an extracted color or non-extracted color. A replacement unit replaces a pixel value of an extracted color with an average value of non-extracted colors. Using a window having a size of 2×2 pixels, a reducing unit generates one pixel from the window after replacement. If even one non-extracted-color pixel exists in the window, the average value of non-extracted colors within the window is determined to be a pixel value of the reduced image. A packing unit concatenates the extracted color, the result of lossless-encoded identification information and lossy-encoded data of the reduced image.

8 Claims, 7 Drawing Sheets

FIG. 3A

NO EXTRACTED COLOR (NUMBER OF "0"s = 4)

| 0 | 0 |
|---|---|
| 0 | 0 |

FIG. 3B

ONE EXTRACTED COLOR (NUMBER OF "0"s = 3)

| 1 | 0 |
|---|---|
| 0 | 0 |

| 0 | 1 |
|---|---|
| 0 | 0 |

| 0 | 0 |
|---|---|
| 1 | 0 |

| 0 | 0 |
|---|---|
| 0 | 1 |

FIG. 3C

TWO EXTRACTED COLORS (NUMBER OF "0"s = 2)

| 1 | 1 |
|---|---|
| 0 | 0 |

| 1 | 0 |
|---|---|
| 1 | 0 |

| 1 | 0 |
|---|---|
| 0 | 1 |

| 0 | 0 |
|---|---|
| 1 | 1 |

| 0 | 1 |
|---|---|
| 0 | 1 |

| 0 | 1 |
|---|---|
| 1 | 0 |

FIG. 3D

THREE EXTRACTED COLORS (NUMBER OF "0"s = 1)

| 1 | 1 |
|---|---|
| 1 | 0 |

| 1 | 0 |
|---|---|
| 1 | 1 |

| 0 | 1 |
|---|---|
| 1 | 1 |

| 1 | 1 |
|---|---|
| 0 | 1 |

FIG. 3E

FOUR EXTRACTED COLORS (NUMBER OF "0"s = 0)

| 1 | 1 |
|---|---|
| 1 | 1 |

0 : NON-EXTRACTED COLOR
1 : EXTRACTED COLOR

| (1,P1) | (1,P2) | (2,P3) |
| --- | --- | --- |
| (2,P4) | (0,P5) | (0,P6) |
| (2,P7) | (4,P8) | (4,P9) |

P5 IS REPLACED WITH P8

FIG. 7

IMAGE ENCODING APPARATUS AND METHOD OF CONTROLLING SAME

BACKGROUND OF THE INVENTION

1. Field of the Invention

The present invention relates to a technique for encoding image data.

2. Description of the Related Art

The following encoding method is available as a technique for compressing a multi-valued image that is a mixture of characters or line drawings and natural images: Inputting an image in block units from an input multi-valued image; extracting identification information indicating whether a pixel is a character or line-drawing image having a color or density designated in advance; applying entropy encoding to the extracted identification information; and, on the other hand, encoding a multi-valued image that is not a character or line drawing by using an orthogonal transform or the like.

Japanese Patent Application Laid-Open No. 04-326669 can be mentioned as one example of a reference that discloses such a technique. According to this reference, an input image is divided into blocks serving as units of orthogonal transformation at the time of encoding, after which a maximum-frequency value, which is a value having the highest probability of occurrence within a block, is assumed to be indicative of a character or line-drawing image. Color information or density information having the maximum-frequency value is then adopted as an extracted color. For every pixel within the block, binary identification information is generated for identifying whether the pixel is one that belongs to the extracted color or one that is a non-extracted color. Lossless encoding processing such as run-length encoding is then applied to the generated identification information. Further, the value of a pixel having the extracted color is replaced with an average value of pixels of the non-extracted colors. The multi-valued image after replacement is then subjected to lossy encoding such as JPEG encoding. Thus, two items of encoded data and an extracted color are combined to generate one block of encoded data.

In case of an image having an attribute of a character or line drawing, it is desired that the edge of the image be retained. In other words, it is preferred that an image having the attribute of a character or line drawing be so adapted that the resolution thereof is maintained.

On the other hand, in the case of an image having the attribute of a natural image, tonality is more important than resolution. That is, in the case of a natural image, a decline in image quality will not be conspicuous even if resolution is lowered somewhat.

If the patent reference cited earlier is considered in this light, it is possible for the resolution of a character or line-drawing image to be maintained, but there remains room for improvement with regard to a natural image.

SUMMARY OF THE INVENTION

The present invention has been devised in view of the above-mentioned problems and provides a technique whereby even an image that is a mixture of images having different attributes, such as a character or line-drawing image and a natural image, etc., is encoded in accordance with the respective attributes, thereby achieving encoding with a higher compression efficiency while suppressing a decline in image quality.

In order to solve the aforementioned problems, the present invention provides an image encoding apparatus for encoding image data, comprising: an input unit for inputting image data; an extraction unit for extracting color of a pixel, which constitutes a high-frequency component, from the input image data as an extracted color; a generating unit for generating identification information for identifying whether each pixel of the image data is a pixel of the extracted color or a pixel of a non-extracted color; a first encoding unit for lossless encoding of the identification information generated by the generating unit; a replacing unit for calculating an average value of pixels of the non-extracted colors in the image data and replacing the value of the pixel of the extracted color with this calculated average value; a reducing unit for performing scanning in the image data, in which the replacement has been made by the replacing unit, using a window of interest having a size of p×q (where p, q are positive integers and at least one is equal to or greater than 2) pixels as a unit, and deriving one pixel value from a window of interest, thereby generating reduced-image data; a second encoding unit for performing lossy encoding of the reduced-image data generated by the reducing unit; and an output unit for concatenating the extracted color obtained by the extraction unit, the encoded data obtained by the first encoding unit and the encoded data obtained by the second encoding unit, and outputting the result as encoded data of the image data; wherein the reducing unit includes: a counting unit for counting number of pixels that have been determined to be of the non-extracted colors within the window based upon the identification information; and a selecting unit which, in a case where the value counted by the counting unit is zero, selects a replacement color, with which the replacing unit has replaced the pixel value within the window, as the value of one pixel after reduction, and in a case where the value counted by the counting unit is one or greater, selects an average value of pixels, which have been determined to be of the non-extracted color within the window, as the value of one pixel after reduction.

In accordance with the present invention, encoding can be performed with higher compression efficiency while resolution is maintained with regard to an image having high-frequency components, such as a character or line-drawing image, and while a decline in image quality is suppressed with regard to a tone image such as a natural image.

Further features of the present invention will become apparent from the following description of exemplary embodiments with reference to the attached drawings.

DESCRIPTION OF THE EMBODIMENTS

Embodiments according to the present invention will now be described in detail with reference to the accompanying drawings.

First Embodiment

An image encoding apparatus according a first embodiment of the present invention will be described taking as an example monochrome multi-valued image data in which one pixel has a density value composed of eight bits (256 tones). In the case of a color image, however, one pixel is expressed by a plurality of components. Accordingly, since the processing indicated below need only be executed for every component, the present invention is not limited to a monochrome image.

Figure 1:
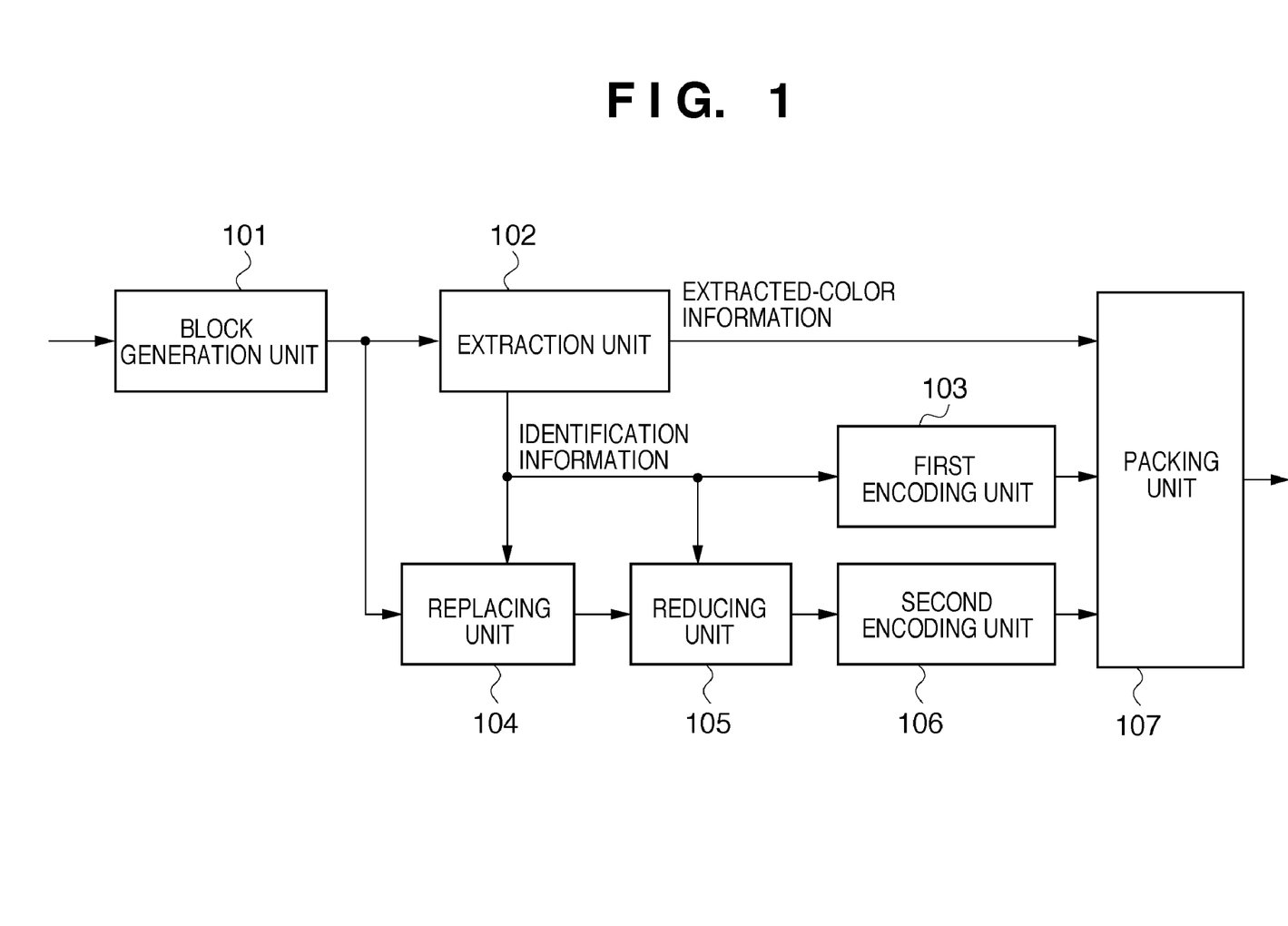
FIG. 1 is a block diagram of an image encoding apparatus according to a first embodiment of the present invention.

FIG. 1 is a block diagram of an image encoding apparatus according to a first embodiment of the present invention. This apparatus includes a block generation unit 101, an extraction unit 102, a first encoding unit 103, a replacing unit 104, a reducing unit 105, a second encoding unit 106 and a packing unit 107. It should be noted that although an appropriate buffer memory is provided between these units in order to synchronize the processing among these units, the buffer memories are not shown.

The block generation unit 101 inputs image data (referred to as "block data" below) in units of a block size of m×n pixels from multi-valued image data to be encoded, and outputs the block data to the extraction unit 102 and replacing unit 104. In this embodiment, it is assumed that m=n=16 holds in order to facilitate an understanding of the invention. Although it is assumed that the source of input of the multi-valued image data to be encoded is an image scanner, the source may be a storage medium storing image data that has not been compressed; the type of this input source does not matter.

The extraction unit 102 extracts extracted-color information and identification information from the input block data, outputs the extracted-color information to the packing unit 107 and outputs the extracted identification information to the first encoding unit 103, replacing unit 104 and reducing unit 105.

A specific example of processing executed by the extraction unit 102 will now be described.

First, the extraction unit 102 calculates an average value AVE of all pixels within the input block data. The extraction unit 102 classifies the pixels into a first group having pixel values equal to or less than the average value AVE and a second group having pixel values greater than the average value AVE. The extraction unit 102 calculates an average value C1 of pixels belonging to the first group and an average value C2 of pixels belonging to the second group. When the difference D (C2−C1) between these average values C1 and C2 is equal to or greater than a preset threshold vale Th, the extraction unit 102 determines the average value C2 (pixels having a high density) to be as the extracted color of the block data of interest and outputs this to the packing unit 107.

Further, if condition D≧Th is satisfied, the extraction unit 102 compares the previously indicated average value AVE with each pixel in the block data and generates binary (1-bit) information for identifying, pixel by pixel, to which of the first and second groups the pixel belongs. If the 1-bit value is "1", this indicates that this pixel is one having the extracted color, and if the 1-bit value is "0", then this indicates this pixel is one having a non-extracted color. Since one block is assumed to consist of 16×16 pixels in this embodiment, (16× 16)-bit information obtained from one block. This (16×16)-bit information is the identification information.

It should be noted that the difference value D can also fall below the threshold vale Th as a matter of course. For example, if the block of interest does not contain a high-frequency component such as a character or line drawing, then, in extreme cases, all pixels within the block will be of the same color. In such case the extraction unit 102 determines "255", for example, to be the extracted color and adopts "0" (non-extracted color) as the identification information of all pixels. Conversely, the extraction unit 102 may adopt the average value AVE as the extracted color and adopt "1" (extracted color) as the identification information of all pixels. In this embodiment, the former is adopted.

The content of processing by the extraction unit 102 in this embodiment is as described above.

The first encoding unit 103 performs lossless encoding of the identification information (16×16 bits) that has been output from the extraction unit 102 and outputs the encoded data to the packing unit 107. In this embodiment, it is assumed that run-length encoding is used as the lossless encoding. However, the type of encoding does not matter so long as it is lossless.

The replacing unit 104 will be described next. The replacing unit 104 replaces a pixel value having the extracted color in the block of interest with the average value of pixel values belonging to non-extracted colors. Specifically, the replacing unit 104 executes the following processing:

Assume that a pixel value having coordinates (x,y) in the block of interest that is output from the block generation unit 101 is represented by P(x,y) and that an item of the identification information from the extraction unit 102 is represented by I(x,y). In a case where I(x,y)=0 holds, pixel P(x,y) is indicative of a pixel of a non-extracted color.

A number N of pixels of non-extracted color is obtained according to the equation below since it will suffice to reduce the number of extracted colors from 16×16. It should be noted that it is not possible for all of the pixels in the block of interest to have an extracted color for the reason described earlier, and the number N of pixels of non-extracted color within the block of interest is always one or greater.

$$N = 16 \times 16 - \Sigma I(x,y)$$

An average value $C_{ave}$ of non-extracted colors can be found from the following equation:

$$C_{ave} = \Sigma \{P(x,y) \times [1-I(x,y)]\}/N$$

Accordingly, the replacing unit 104 executes the following processing during raster scanning within the block of interest:

The replacing unit 104 outputs P(x,y) in case of I(x,y)=0.
The replacing unit 104 outputs $C_{ave}$ in case of I(x,y)=1.

As a result of the foregoing, the replacing unit 104 replaces a pixel value having the extracted color in the block of interest with the average value of pixel values that belong to non-extracted colors. It should readily be understood from the foregoing explanation that the replacing unit 104 executes processing for removing high-frequency components from the block data that is input thereto.

The second encoding unit 106 in this embodiment performs lossy JPEG encoding that is suited to a natural image. It is known that JPEG encoding involves execution of three types of processing, namely DCT, quantization and entropy encoding. The DCT is a frequency transformation. As mentioned earlier, block data that has undergone replacement processing by the replacing unit 104 contains very few high-frequency components. For this reason, alternating current (AC) components obtained by applying a DCT to the block data that results from the replacement processing in the replacing unit 104 inevitably have small values. By further applying quantization processing, these AC components are converted to "0" or to values that approximate "0". Encoding efficiency, therefore, is high. In general, however, JPEG encoding is encoding performed in units of 8×8 pixels. In a case where one block consists of 16×16 pixels as in this embodiment, encoding processing of 8×8 pixels is executed four times with regard to one block. According to this embodiment, in view of the fact that high-frequency components have been removed as mentioned above, resolution is lowered further and compression efficiency is raised further. Accordingly, the reducing unit 105, which reduces the block data by half in both the horizontal and vertical directions, is inserted between the replacing unit 104 and second encoding unit 106.

Figure 2:
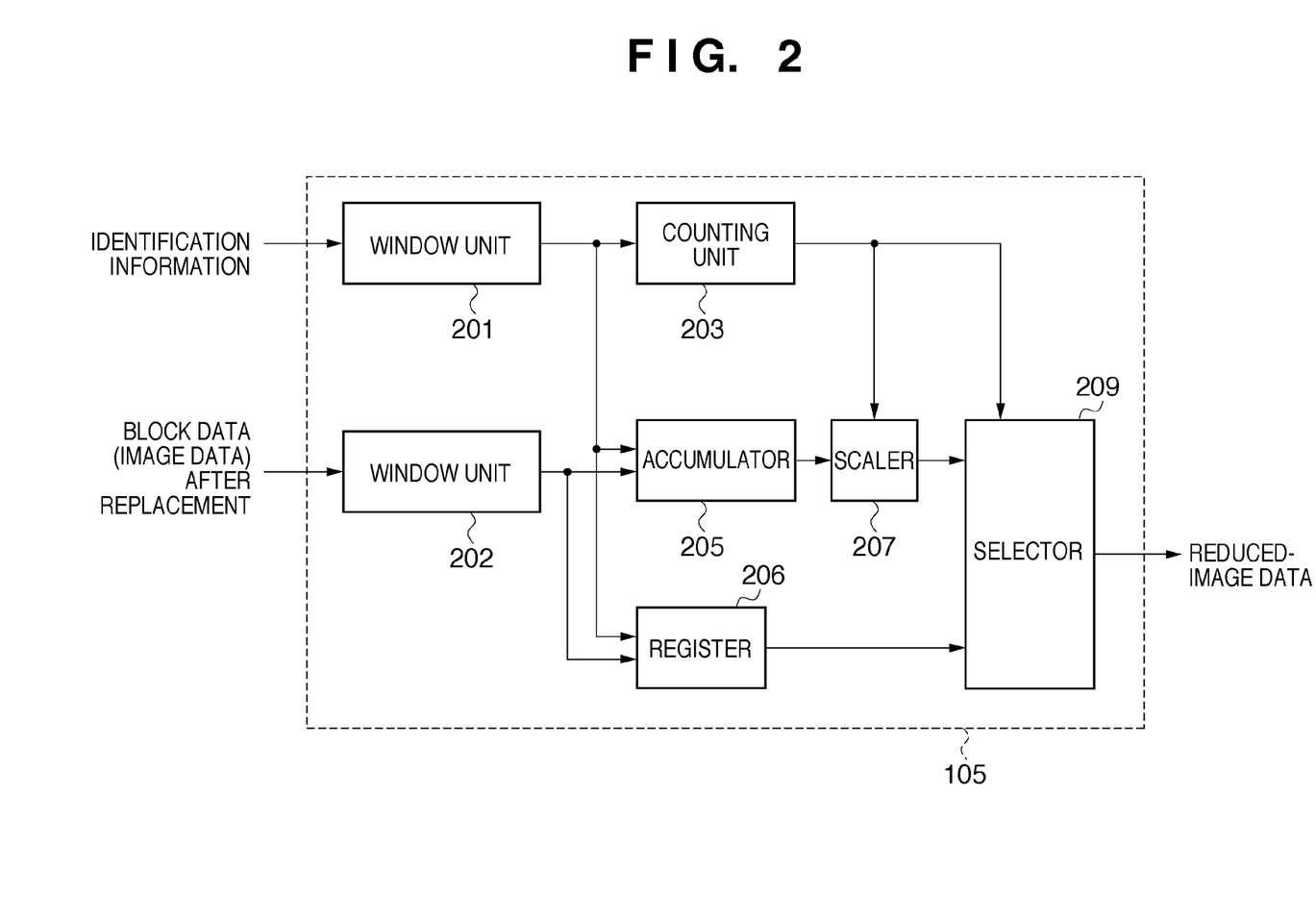
FIG. 2 is a block diagram of a reducing unit shown in FIG. 1.

The reducing unit 105 will be described next. FIG. 2 is a block diagram of the reducing unit 105.

The reducing unit 105 in this embodiment has window units 201, 202, a counting unit 203, an accumulator 205, a register 206, a scaler 207 and a selector 209.

The window unit 201 performs scanning within the (16×16)-bit identification information from the extraction unit 102 in units of a window of size 2×2. Whenever the position of the window of interest is updated by scanning, the window unit 201 outputs 2×2 items (four bits) of identification information from within the window of interest to the counting unit 203, accumulator 205 and register 206.

The other window unit 202 performs scanning within the block data, which results from the replacement processing in replacing unit 104 (i.e., within image data composed of 16×16 pixels), in units of a window of size 2×2. Whenever the position of the window of interest (2×2 pixels) is updated by scanning, the window unit 202 outputs the data within the window to the accumulator 205 and register 206. It should be noted that window units 201 and 202 execute processing in synch with each other.

Whenever 2×2 items of identification information from the window unit 201 are input thereto, the counting unit 203 counts the number of "0"s (the number of pixels of non-extracted color) in this information and outputs the count to the selector 209 and scaler 207. The count value that is output by the counting unit 203 is any one of 0 to 4.

Figure 3A:
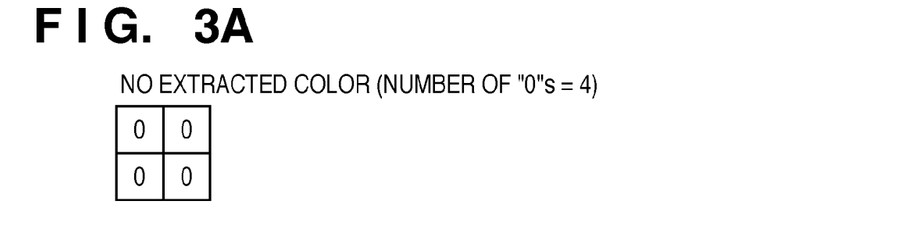
FIGS. 3A to 3E are diagrams illustrating the corresponding relationship between values counted by a counter in the reducing unit and identification information within a window.
Figure 3B:
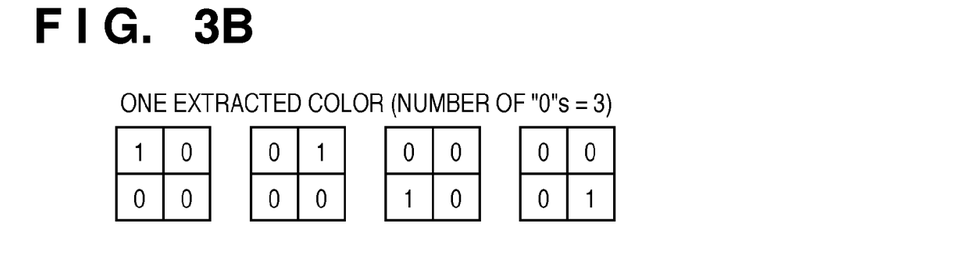
Figure 3C:
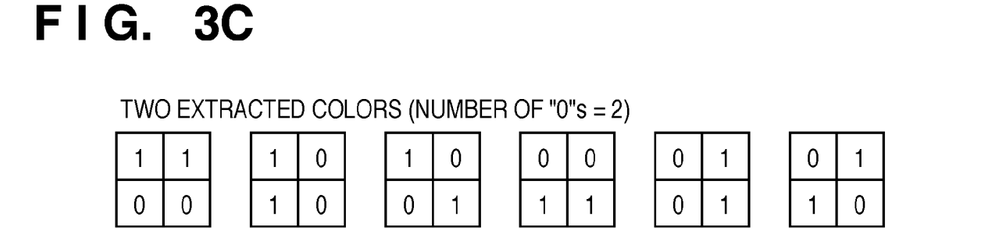
Figure 3D:
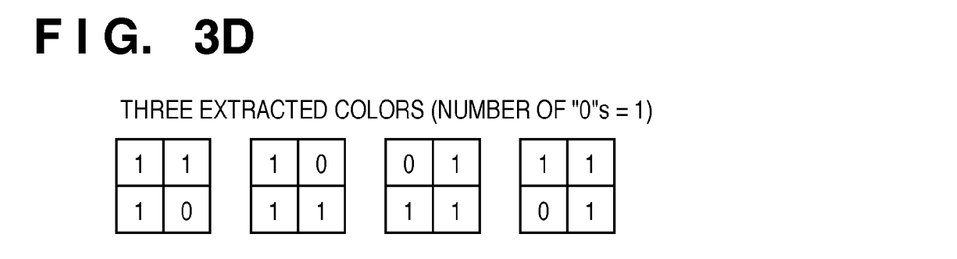
Figure 3E:
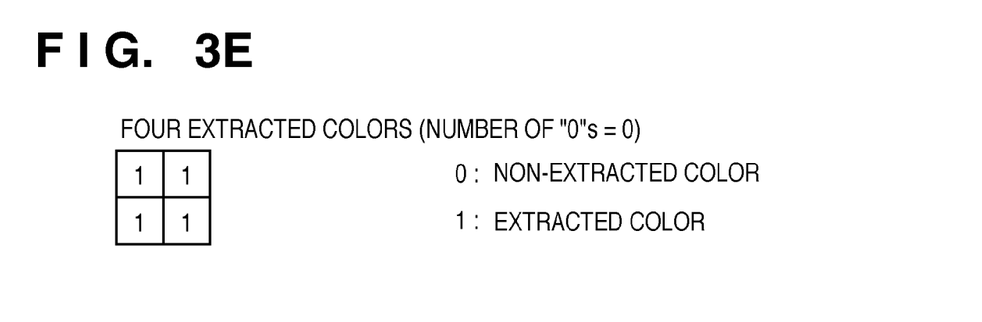

FIGS. 3A to 3E illustrate combinations of windows having a size of 2×2 pixels and items (0 or 1) of identification information within the windows. FIG. 3A illustrates no extracted colors, and FIG. 3B illustrates an example in which the number of extracted colors is one. Further, FIGS. 3C to 3E illustrate examples in which the numbers of extracted colors are two, three and four, respectively. As will be understood from these drawings, the counting unit 203 can be simply constructed as a 4-input look-up table.

In a case where the count value from the counting unit 203 is equal to or greater than "1", that is, if at least one pixel of a non-extracted color exists in the window of 2×2 pixels, the selector 209 selects and outputs a value from the scaler 207. Further, in a case where the count value is "0", that is, if all pixels of the 2×2 pixels are pixel values that have been replaced, the selector 209 selects and outputs a pixel value from the register 206. Accordingly, the counting unit 203 mentioned earlier can actually be constituted by a look-up table that determines whether the identification information of the input window is the pattern of FIG. 3E and outputs the result of the determination.

The accumulator 205 cumulatively adds pixel values for which items of the identification information are "0" in the 2×2 items of pixel data. In other words, the accumulator 205 cumulatively adds pixel values of non-extracted colors in the 2×2 pixels. The scaler 207 divides the cumulative pixel value that has been output from the accumulator 205 by the value that has been output from the counting unit 203, thereby calculating the average value of non-extracted colors within the window and outputting the average value to the selector 209. It should be noted that in a case where the count value from the counting unit 203 is "0", the scaler 207 does not execute division processing or may just as well output any value. The reason for this is that if the count value is "0", the selector 209 does not select a pixel value from the scaler 207.

On the other hand, in a case where an item of the identification information is "1", the pixel value that has been output from the window unit 202 is held by the register 206 and this value is input to the selector 209. If all 2×2 items of the identification information are "0"s, that is, if the count value from the counting unit 203 is "4", then the register 206 continues to hold the value held previously. No problems arise. The reason for this is that in this case, the selector 209 selects a pixel value from the scaler 207.

As a result of the processing described above, the selector 209 outputs one pixel value in units of the (2×2)-pixel window. As a result, from one input block (image data of 16×16 pixels), it is possible to generate image data of 8×8 pixels, which is half the number of pixels in both the horizontal and vertical directions.

The reducing unit 105 of this embodiment will be considered further.

As described earlier, the replacing unit 104 replaces a pixel value of an extracted color in the block data (16×16 pixels) with a pixel having an average value (referred to as a "replacement color" below) of pixels of non-extracted colors. Accordingly, the block data after the replacement has few high-frequency components, as mentioned earlier. However, the replacement color is the average value of non-extracted colors of the entire block and is not the average value of the window (2×2 pixels). Therefore, in a case where a pixel of a non-extracted color and the replacement color are mixed within the window of 2×2 pixels, there is a possibility that a difference that is not negligible will occur between these. If the average value of the 2×2 pixels were merely to be adopted as the value of one pixel after reduction processing, then 2×2 pixels at the time of decoding would be values affected by the replacement color.

Although the details will be described later, the pixel of a replacement color is again replaced with a pixel of an extracted color in the decoding apparatus, and therefore the pixel of the replacement color is not important. Rather, what is important is to avoid the pixel value of a non-extracted color from being affected by the pixel value of the replacement color, as mentioned above. As described earlier, therefore, it is so arranged that in a case where even one pixel of a non-extracted color exists in the window, the average value is adopted as the pixel value of the one pixel generated from this window with the exception of the replacement color. As a result, it is possible to suppress a decline in the image quality of the image after reduction.

The foregoing is the description of the reducing unit 105 in this embodiment.

With reference again to FIG. 1, the second encoding unit 106 performs JPEG encoding, which is lossy encoding, in units of 8×8 pixels that have been output from the reducing unit 105. JPEG encoding itself involves performing a DCT, quantization and entropy encoding as is well known and therefore need not be described here.

The packing unit 107 concatenates and outputs, in the order mentioned, the color (extracted color) of the high-frequencycomponent pixel extracted by the extraction unit 102, the lossless-encoded data of the identification information (binary) generated by the first encoding unit 103 and the lossy-encoded data of the multi-valued image generated by the second encoding unit 106.

The foregoing is a description of the configuration of the image encoding apparatus and content of processing thereof according to this embodiment. Described next will be an image decoding apparatus for decoding encoded data generated by the image encoding apparatus described above.

Figure 4:
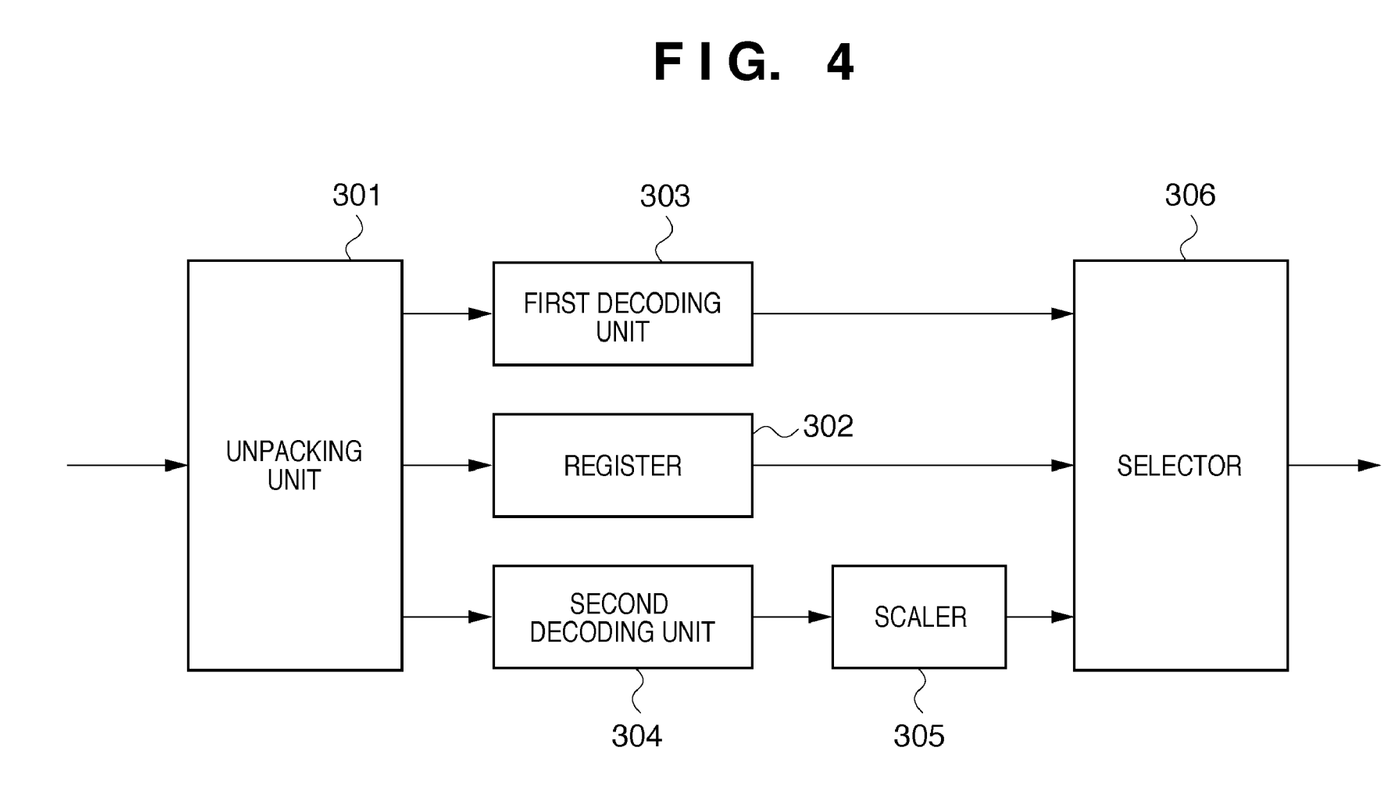
FIG. 4 is a block diagram of an image decoding apparatus according to an embodiment of the present invention.

FIG. 4 is a block diagram of an image decoding apparatus according to this embodiment of the present invention. This apparatus includes an unpacking unit 301, a register 302, a first decoding unit 303, a second decoding unit 304, a scaler 305 and a selector 306. It should be noted that although an appropriate buffer is provided between these units in order to synchronize the processing among these units, the buffers are not shown. Operation of each of these units when encoded data of one block of data is decoded will now be described.

The encoded data is input to the unpacking unit 301. It is assumed that this encoded data has the following structure: "extracted color"+"lossless-encoded data of the identification information"+"lossy-encoded data of the multi-valued image"

The unpacking unit 301 stores the extracted color in the register 302 temporarily. Further, the unpacking unit 301 outputs the encoded data of the identification information to the first decoding unit 303 and outputs the lossy-encoded data of the multi-valued image to the second decoding unit 304.

The first decoding unit 303 performs run-length decoding processing that is the exact reverse of the processing executed by the first encoding unit 103 in FIG. 1 and restores the identification information of 16×16 bits.

The second decoding unit 304 executes JPEG decoding processing that is the exact reverse of the processing executed by the 106 in FIG. 1 and restores the multi-valued image data of 8×8 pixels. The scaler 305 doubles the image data of the 8×8 pixels, which has been restored by the second decoding unit 304, in both the horizontal and vertical directions and generates image data of 16×16 bits. For each pixel input thereto, the scaler 305 repeatedly outputs this pixel value 2×2 times. As a result, a multi-valued image of 16×16 pixels which is the same number as that of the decoded identification information can be restored. It should be noted that the scaler 305 may be adapted to so as to generate image data of 16×16 pixels from 8×8 pixels by executing bilinear interpolation processing.

The selector 306 inputs the decoded identification information and the decoded multi-valued image in the order of raster scanning. In a case where an item of identification information is "1", the selector 306 selects and outputs a pixel value (extracted color) held in the register 302. In a case where an item of the identification information is "0", the selector 306 selects and outputs a pixel value from the scaler 305. The selector 306 restores the block data of 16×16 pixels by executing the above-described processing 16×16 times.

The processing executed by the image encoding apparatus of this embodiment as described above can be summarized as follows:
In a case where high-frequency components represented by a character or line drawing exist in block data of m×n pixels (m=n=16 in this embodiment), the color of the character or line drawing is determined to be the extracted color. Identification information of m×n items (bits) indicating whether each pixel in the block data is a pixel of the extracted color or a pixel of a non-extracted color is generated, and this identification information is subjected to lossless encoding. The average value of pixels of non-extracted color is adopted as a replacement color, the pixel value of the extracted color is replaced with this replacement color and a replacement image composed of m×n pixels of few high-frequency components is obtained. Furthermore, the value of one pixel is derived from a window of a size of p×q pixels (where p, q are integers equal to or greater than 2, with p=q=2 being adopted in this embodiment) in this replacement image, whereby reduced-image data composed of (m/p)×(n/q) pixels is obtained. In a case where even one non-extracted-color pixel exists within the window in this reduced-image data, the average value of non-extracted-color pixels within this window is adopted as the value of one pixel after reduction. As a result, reduced image data in which the influence of the replacement color is minimized is obtained. This reduced-image data is subjected to lossy encoding. The thus obtained extracted color, lossy-encoded data and lossless-encoded data are concatenated and output as encoded data with regard to one block.

The result of the foregoing is that in a case where an image that is mixture of a character or line-drawing image and a natural image is encoded, encoded data having a high rate of compression can be generated while the resolution of the character or line-drawing image is maintained and, moreover, while a high image quality is maintained for the natural image by suppressing the influence of the character or line-drawing image.

It should be noted that the although the block generation unit 101 in this embodiment has been described on the assumption that image data of size 16×16 pixels is input thereto, the present invention is not limited to this size. In a case where the block generation unit 101 performs JPEG encoding, it will suffice if the size of one block is made 8m×8n (where m, n are positive integers and at least one of them is 2 or greater), which is a multiple of 8 in both the horizontal and vertical directions.

Further, although the reducing unit 105 has been described on the assumption that it halves size in both the horizontal and vertical directions, the present invention is not limited to this size. For example, it does not matter if the size of one block is made 24×24 and the window size for reduction processing is made 3×3 pixels.

Further, it does not matter if the block generation unit 101 is excluded. That is, in the case of an image such as one in which a character or line drawing of a single color exists in a gradation image, for example, an ordinary document having only character stings, the entire image to be encoded may be handled as a block. It should be noted that the number of pixels in each of the horizontal and vertical directions of an image to be encoded need not be a whole-number multiple of 8, which is the unit of JPEG encoding. The reason is that in this case, dummy data may be appended to the end of an image to thereby obtain a whole-number multiple of 8, and the dummy data need only be excluded at the time of decoding.

Further, it is described in the first embodiment that the first encoding unit 103 performs run-length encoding and that the second encoding unit 106 performs JPEG encoding. As long as the first encoding unit 103 performs lossless encoding of binary data, the type of the encoding does not matter. Further, as long as the second encoding unit 106 executes frequency transformation processing, quantization processing and entropy encoding processing, the type thereof does not matter. Besides the DCT cited above, a wavelet transformation can also be mentioned as a typical example of frequency transformation processing.

Modification of First Embodiment

Processing similar to that of the first embodiment may be implemented by a computer program executed by a general-purpose information processing apparatus (a typical example of which is a personal computer).

Figure 7:
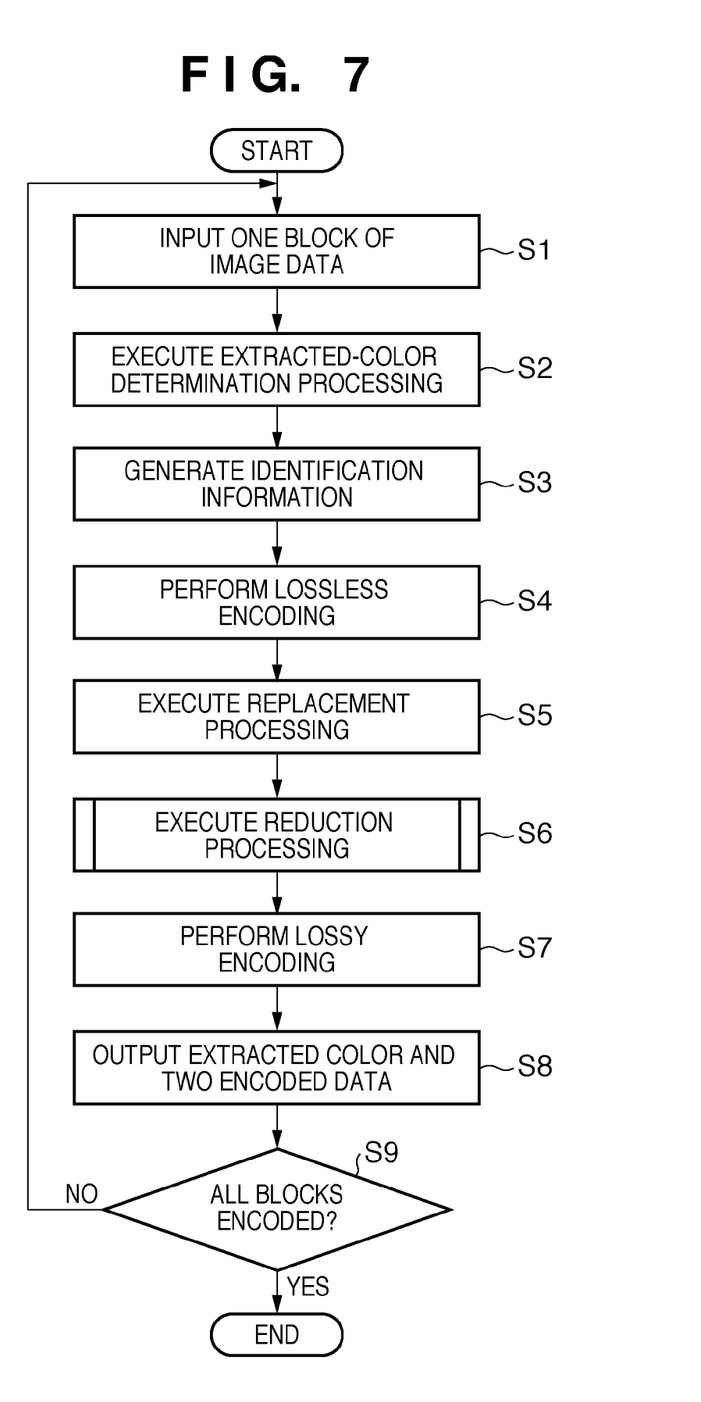
FIG. 7 is a flowchart illustrating processing executed by a computer program in a modification of the first embodiment.

FIG. 7 is a flowchart illustrating encoding processing in this computer program. It should be noted that the computer program for the processing according to FIG. 7 has been stored on a hard disk and is read into a RAM by a CPU that functions as a controller.

In step S1, image data (16×16 pixels) having the size of one block is input from image data to be encoded. The source of the input may be an image scanner or a storage device in which image data that has not been compressed is stored as a file.

In step S2, an extracted color is determined from the input block data and information concerning the extracted color that has been determined is held in the RAM temporarily. Next, in step S3, identification information (16×16 bits) that identifies whether each pixel in the block is a pixel of the extracted color or a pixel of a non-extracted color is generated. The algorithm for determining the extracted color and generating the identification information is similar to that of the first embodiment.

In step S4, the identification information is subjected to lossless encoding and the result of encoding is held in the RAM temporarily.

In step S5, the average value of pixels of non-extracted color is calculated and processing for replacing the pixel value of the extracted color with the average value is executed. Then, in step S6, the block data resulting from replacement is reduced to one half in both the horizontal and vertical directions. This reduction processing also is executed in a manner similar to that of the first embodiment.

In step S7, the reduced image data is subjected to lossy encoding. It will suffice if this lossy encoding employs JPEG encoding similar to that of the first embodiment.

In step S8, the temporarily retained extracted color, lossless-encoded data and lossy-encoded data are concatenated and output to a storage device such as a hard-disk drive.

In step S9, it is determined whether encoding has been performed with regard to all blocks and, if the answer is "NO", then processing from step S1 onward is repeated.

Thus, as described above, it is possible to implement the first embodiment by a computer program.

Second Embodiment

In a case where all pixels within the window of size 2×2 pixels are pixels having a replacement color, the selector 209 (see FIG. 2) of the first embodiment outputs this replacement color as the pixel value of one pixel after execution of reduction processing. Accordingly, if a pixel of a non-extracted color and a pixel indicated by a replacement color are mixed with the 8×8 pixels obtained by reduction processing, there is a possibility that the value of the non-extracted-color pixel will be influenced by the extracted color owing to the DCT and quantization of JPEG encoding.

Accordingly, in a second embodiment of the invention, an example in which this point is further improved upon will be described.

The configuration of the image encoding apparatus according to the second embodiment is the same as that shown in FIG. 1; what differs is the configuration of the reducing unit 105.

Figure 5:
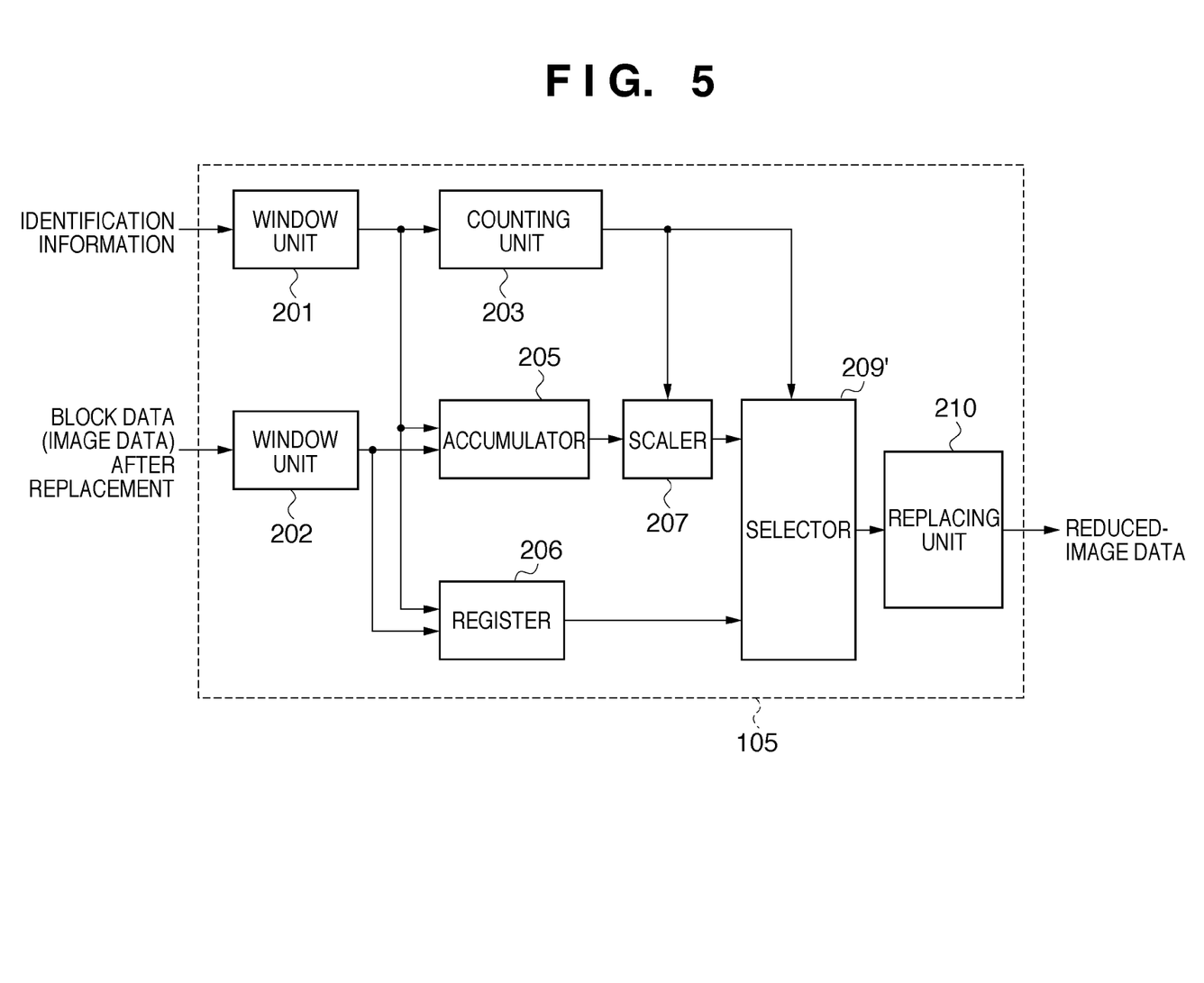
FIG. 5 is a block diagram of a reducing unit in a second embodiment of the present invention.

FIG. 5 is a block diagram of the reducing unit 105 according to the second embodiment. Units having functions the same as those shown in FIG. 2 are designated by like reference characters and need not be described again. FIG. 5 differs from FIG. 2 in that processing by a selector 209' is somewhat different and in that a replacing unit 210 is provided.

The selector 209' is similar to the selector 209 of FIG. 2 in that a pixel value is selected from either the scaler 207 or register 206 in accordance with the count value from the counting unit 203. However, the selector 209' in the second embodiment differs in that it outputs the count value from the counting unit 203 and the selected pixel value as a pair.

The replacing unit 210 inputs 8×8 {count value, pixel value} pairs from the selector 209'. A pixel for which the count value is "0" indicates that this pixel is a replacement color. Further, in a case where the count value is equal to or greater than 1, this pixel value is indicative of an average value of pixels of non-extracted color. The larger the count value, the larger the number of non-extracted-color pixels from which the average value for this pixel value is calculated.

Since the pixel value of a replacement color is replaced with the pixel value of an extracted color at the time of decoding, this pixel value is not that important. Rather, it is preferred that the replacement color not affect the pixel value of another non-extracted color when JPEG encoding is performed and that it be a value that raises encoding efficiency.

Therefore, the replacing unit 210 performs scanning within the reduced image and, when it discovers a pixel (a pixel of interest) for which the count value is "0", determines a pixel value having the largest count value among eight pixels neighboring the pixel of interest as being a re-replacement color and replaces the pixel value of the pixel of interest with this re-replacement color.

This example will be described with reference to FIG. 6, which illustrates a 3×3 area the center of which is a pixel of interest in a reduced image and which includes the pixels neighbor the center pixel. The values in each box are {count value, pixel value} (in the illustration, the pixel values are P1 to P9). Since the assumption is that the pixel of interest is the replacement color, the count value for this pixel is "0", as illustrated in FIG. 6.

Figure 6:
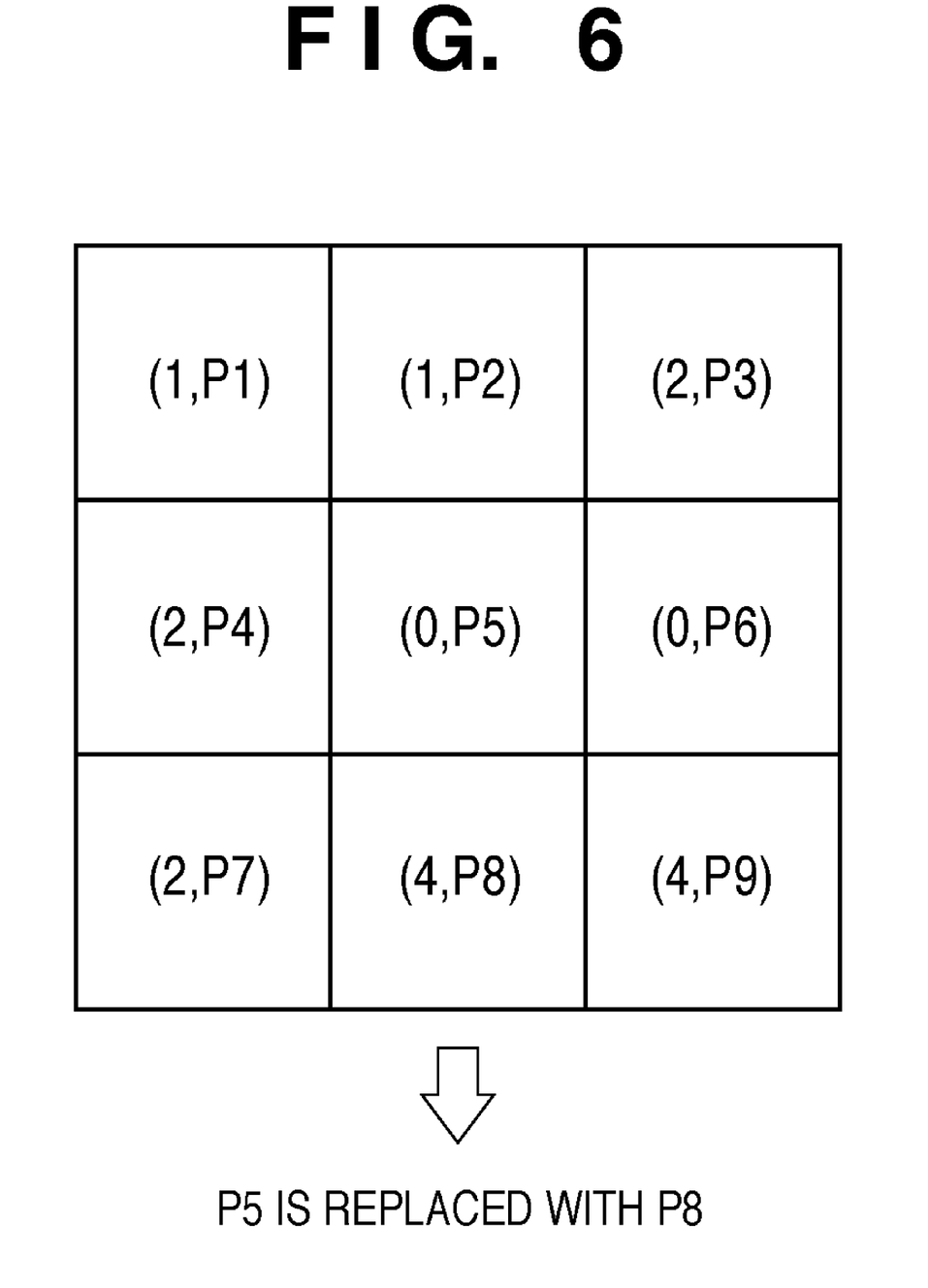
FIG. 6 is a diagram useful in describing processing for performing replacement in a reduced image according to the second embodiment.

In the case of FIG. 6, seven pixels for which the count value is "1" or greater exist among the pixels neighboring the pixel of interest (the pixel to the right of the pixel of interest is excluded because its count value is "0"). Among the seven pixel values, the pixel values having the largest count value, which is "4", are pixel values P8 and P9. This embodiment is such that in a case where there is a plurality of pixel values having the largest count value, the pixel value at the position that comes first in the raster-scan order is adopted as the replacement pixel value of the pixel of interest. In the case of FIG. 6, therefore, the pixel value P5 of the pixel of interest is replaced with the pixel value P8.

As a result of the foregoing, the second encoding unit 106 (see FIG. 1) encodes an image having even fewer high-frequency components in comparison with the first embodiment and is capable of raising the compression efficiency. Moreover, by further replacing a pixel value of a replacement color with a neighboring pixel value of a non-extracted color, the probability that the pixel value of the non-extracted color will be maintained is raised and a decline in image quality can be suppressed.

Third Embodiment

The processing executed by the replacing unit 210 of the second embodiment may be adapted as set forth below.

When the pixel of interest is a replacement color, it is replaced with the average value of neighboring pixel values for which the count value is "1" or greater. In the case of FIG. 6, if it is assumed that the pixel value after replacement of the pixel of interest will be P5', then P5' is calculated according to the following equation:

$$P5'=(P1+P2+P3+P4+P7+P8+P9)/7$$

Actions and effects similar to those of the second embodiment can be obtained with the third embodiment as well.

Fourth Embodiment

As in the case of the modification of the first embodiment described above, processing similar to that of the second and third embodiments may be implemented by an application program executed by a general-purpose information processing apparatus such as a personal computer.

Further, a computer program usually can be stored on a computer-readable storage medium such as a CD-ROM, the CD-ROM can be loaded in a reading device (a CD-ROM drive) and the program can be executed upon being copied to or installed in a system. Accordingly, it is obvious that such a computer-readable storage medium also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-244447, filed Sep. 20, 2007, which is hereby incorporated by reference herein in its entirety.

What is claimed is:

1. An image encoding apparatus for encoding image data, comprising:
    an input unit for inputting image data;
    an extraction unit for extracting color of a pixel, which constitutes a high-frequency component, from the input image data as an extracted color;
    a generating unit for generating identification information for identifying whether each pixel of the image data is a pixel of the extracted color or a pixel of a non-extracted color;
    a first encoding unit for lossless encoding of the identification information generated by said generating unit;
    a replacing unit for calculating an average value of pixels of the non-extracted colors in the image data and replacing the value of the pixel of the extracted color with this calculated average value;
    a reducing unit for performing scanning in the image data, in which the replacement has been made by said replacing unit, using a window of interest having a size of p×q (where p, q are positive integers and at least one is equal to or greater than 2) pixels as a unit, and deriving one pixel value from the window of interest, thereby generating reduced-image data;
    a second encoding unit for performing lossy encoding of the reduced-image data generated by said reducing unit; and
    an output unit for concatenating the extracted color obtained by said extraction unit, the encoded data obtained by said first encoding unit and the encoded data obtained by said second encoding unit, and outputting the result as encoded data of the image data;
    wherein said reducing unit includes:
    a counting unit for counting number of pixels that have been determined to be of the non-extracted colors within the window based upon the identification information; and
    a selecting unit which, in a case where the value counted by said counting unit is zero, selects a replacement color, with which said replacing unit has replaced the pixel value within the window, as the value of one pixel after reduction, and in a case where the value counted by said counting unit is one or greater, selects an average value of pixels, which have been determined to be of the non-extracted colors within the window, as the value of one pixel after reduction.

2. The apparatus according to claim 1, wherein said reducing unit further includes:
    a determination unit for determining whether each pixel in the reduced-image data constituted by the pixel selected by said selecting unit is a pixel of the replacement color or the average value of pixels of the non-extracted colors; and
    a re-replacing unit which, if a pixel of interest in the reduced-image data is determined by said determination unit to be the pixel of the replacement color, is for deciding a re-replacement color based upon pixels situated adjacent to the pixel of interest and having the average value of pixels of the non-extracted colors.

3. The apparatus according to claim 2, wherein said re-replacing unit decides upon an average value, for which the value counted by said counting unit is largest among the pixels having the average value of pixels of the non-extracted colors neighboring the pixel of interest, as the re-replacement color.

4. The apparatus according to claim 2, wherein said re-replacing unit decides upon an average value of pixels having the average value of pixels of the non-extracted colors neighboring the pixel of interest, as the re-replacement color.

5. The apparatus according to claim 1, wherein said input unit inputs image data in units of m×n pixels, (where m, n are positive integers that satisfy the condition m≧p, n≧q, and at least either one of m, n satisfies the condition m>p or n>q).

6. The apparatus according to claim 1, wherein said first encoding unit performs run-length encoding and said second encoding unit performs encoding that includes frequency transformation processing, quantization processing and entropy encoding processing.

7. A non-transitory computer-readable storage medium storing a computer program, which when executed by a computer causes the computer to function as an image encoding apparatus set forth in claim 1.

8. A method of controlling an image encoding apparatus for encoding image data, comprising:
    an input step of inputting image data;
    an extraction step of extracting color of a pixel, which constitutes a high-frequency component, from the input image data as an extracted color;
    a generating step of generating identification information for identifying whether each pixel of the image data is a pixel of the extracted color or a pixel of a non-extracted color;
    a first encoding step of lossless encoding of the identification information generated at said generating step;

a replacing step of calculating an average value of pixels of the non-extracted colors in the image data and replacing the value of the pixel of the extracted color with this calculated average value;

a reducing step of performing scanning in the image data, in which the replacement has been made at said replacing step, using a window of interest having a size of p×q (where p, q are positive integers and at least one is equal to or greater than 2) pixels as a unit, and deriving one pixel value from the window of interest, thereby generating reduced-image data;

a second encoding step of performing lossy encoding of the reduced-image data generated at said reducing step; and an output step of concatenating the extracted color obtained at said extraction step, the encoded data obtained by said first encoding step and the encoded data obtained by said second encoding step, and outputting the result as encoded data of the image data;

wherein said reducing step includes:

a counting step of counting number of pixels that have been determined to be of the non-extracted colors within the window based upon the identification information; and a selecting step which, in a case where the value counted at said counting step is zero, is a step of selecting a replacement color, with which said replacing step has replaced the pixel value within the window, as the value of one pixel after reduction, and in a case where the value counted at said counting step is one or greater, is a step of selecting an average value of pixels, which have been determined to be of the non-extracted colors within the window, as the value of one pixel after reduction.

* * * * *